United States Patent
Seki et al.

(10) Patent No.: US 8,494,050 B2
(45) Date of Patent: Jul. 23, 2013

(54) MOVING PICTURE CODING DEVICE AND MOVING PICTURE CODING METHOD

(75) Inventors: Yukinaga Seki, Kyoto (JP); Kenjiro Tsuda, Osaka (JP); Tatsuro Juri, Osaka (JP); Yuki Kobayashi, Osaka (JP); Takashi Masuno, Osaka (JP); Katsuo Saigo, Hyogo (JP); Hiroaki Shimazaki, Osaka (JP); Takuma Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 12/937,757

(22) PCT Filed: May 12, 2009

(86) PCT No.: PCT/JP2009/002061
§ 371 (c)(1),
(2), (4) Date: Oct. 14, 2010

(87) PCT Pub. No.: WO2009/141973
PCT Pub. Date: Nov. 26, 2009

(65) Prior Publication Data
US 2011/0032989 A1    Feb. 10, 2011

(30) Foreign Application Priority Data
May 20, 2008 (JP) .................................. 2008-131509

(51) Int. Cl.
H04N 7/12   (2006.01)
H04N 11/02  (2006.01)
H04N 11/04  (2006.01)

(52) U.S. Cl.
USPC ............ 375/240.12; 375/240.01; 375/240.13; 375/240.15; 375/240.26

(58) Field of Classification Search
USPC .............. 375/240.01, 240.13, 240.15, 240.26
See application file for complete search history.

(56) References Cited

U.S. PATENT DOCUMENTS 6,819,713 B1   11/2004   Sato
7,920,202 B2 *  4/2011   Park et al. .................... 348/349

(Continued)

FOREIGN PATENT DOCUMENTS

JP    09-130806    5/1997
JP    10-257500    9/1998

(Continued)

OTHER PUBLICATIONS

International Search Report issued Jul. 14, 2009 in International (PCT) Application No. PCT/JP2009/002061.

(Continued)

*Primary Examiner* — Sath V Perungavoor
*Assistant Examiner* — Geepy Pe
(74) *Attorney, Agent, or Firm* — Wenderoth, Lind & Ponack, L.L.P.

(57) ABSTRACT

Provided is a moving picture coding device which makes it possible to suppress deterioration in coding efficiency caused by flickers occurring at a time of high-speed capturing under fluorescent lamp lighting or the like. A moving picture coding device which codes a plurality of pictures obtained by capturing an object, the moving picture coding device including: a luminance information acquisition unit which acquires luminance information which indicates a luminance level of light in an environment where the object is captured; and a coding unit which codes the pictures, using a prediction coding method in which a picture type is applied in the coding of the pictures according to a flicker state of the light obtained from the luminance information.

3 Claims, 11 Drawing Sheets

U.S. PATENT DOCUMENTS

2006/0055813 A1 3/2006 Nakata et al.
2006/0274159 A1 12/2006 Kobayashi

FOREIGN PATENT DOCUMENTS

| JP | 2000-134631 | 5/2000 |
| JP | 2006-084556 | 3/2006 |
| JP | 2006-287743 | 10/2006 |
| JP | 2007-158712 | 6/2007 |

OTHER PUBLICATIONS

Full machine English translation of JP 10-257500, Sep. 1998.

* cited by examiner

MOVING PICTURE CODING DEVICE AND MOVING PICTURE CODING METHOD

TECHNICAL FIELD

The present invention relates to a moving picture coding device which codes data regarding a moving picture, and a moving picture coding method, and particularly to a moving picture coding technique which makes it possible to suppress deterioration in coding efficiency caused by flickers occurring at a time of high-speed capturing under fluorescent lamp lighting or the like.

BACKGROUND ART

Image data obtained by capturing under fluorescent lamp lighting includes flicker components generated by a power supply frequency of the fluorescent lamp. For example, a commercial power supply frequency is 50 Hz in the Kanto area of Japan, and a flicker frequency is 100 Hz because a fluorescent lamp flickers in each of half-wave rectification cycles of the same. A cycle of lighting flicker (flicker cycle) and a cycle of capturing (capturing cycle) differ from each other when capturing at, for instance, a frame rate of 60 fields per second is performed under such a lighting environment, and consequently a luminance of each of field images differs and a video signal includes flicker components.

There was a problem that compression efficiency of the video signal deteriorated when the video signal including such flicker components was coded. A conventional technique has been disclosed which removes noise components caused by flickers and suppresses the deterioration in the compression efficiency of the video signal (e.g., refer to Patent Literature 1). With the conventional technique, a signal level of the video signal is differentially corrected based on an amount of change (difference) in the signal level, so as to remove, from the signal level, the noise components caused by the flickers. This makes it possible to suppress the deterioration in the compression efficiency of the video signal, thereby suppressing deterioration in coding efficiency caused by the flickers.

CITATION LIST

[Patent Literature]
PTL 1
Japanese Unexamined Patent Application Publication No. 9-130806

SUMMARY OF INVENTION

Technical Problem

However, the above conventional technique has a problem that there is a case where it is not possible to suppress the deterioration in the coding efficiency caused by the flickers because it is difficult to remove the noise components caused by the flickers.

In other words, when the flickers occur due to a light condition in an environment where an object is captured and where capturing is performed in a capturing cycle which is significantly shorter than a flicker cycle, an average luminance significantly differs between each of images. For this reason, the conventional technique disclosed in the above Patent Literature 1 makes it difficult to differentially correct a signal level and remove the noise components caused by the flickers because a difference in signal level between video signals becomes too large.

In particular, when noise components caused by flickers cannot be removed from an image obtained by capturing with timing at which a lighting luminance is low, a signal-to-noise power ratio of the image is decreased. To put it differently, it is impossible to suppress the deterioration in the coding efficiency caused by the flickers.

As stated above, when the capturing cycle is significantly shorter than the flicker cycle, the above conventional technique has the problem that there is the case where it is not possible to suppress the deterioration in the coding efficiency caused by the flickers because it is difficult to remove the noise components caused by the flickers.

The present invention has been devised to solve such a conventional problem, and has an object to provide a moving picture coding device and a moving picture coding method which make it possible to suppress the deterioration in the coding efficiency and achieve highly efficient coding even when the flickers occur due to the light condition in the environment where the image is obtained by capturing and the capturing cycle is significantly shorter than the flicker cycle.

Solution to Problem

In order to achieve the above object, a moving picture coding device according to the present invention is a moving picture coding device which codes a plurality of pictures obtained by capturing an object, the moving picture coding device including: a luminance information acquisition unit which acquires luminance information which indicates a luminance level of light in an environment where the object is captured; and a coding unit which codes the pictures, using a prediction coding method in which a picture type is applied in the coding of the pictures according to a flicker state of the light obtained from the luminance information.

Furthermore, the present invention can be realized not only as such a moving picture coding device but also as an integrated circuit which includes each of processing units included in the moving picture coding device and controls the moving picture coding device and a method having a process performed by each processing unit as a step. Moreover, the present invention can be realized as a program causing a computer to execute such steps, a computer-readable recording medium on which such a program is recorded such as a CD-ROM, and information, data, or signals indicating the program.

The program, information, data, and signals may be distributed via a communications network such as the Internet.

Advantageous Effects of Invention

Even when the flickers occur due to the light condition in the environment where the image is obtained by capturing and the capturing cycle is significantly shorter than the flicker cycle, the moving picture coding device and the moving picture coding method according to the present invention make it possible to suppress the deterioration in the coding efficiency caused by the flickers and achieve the highly efficient coding.

(Information Regarding Technical Background of the Present Application)

The disclosure of Japanese Patent Application No. 2008-131509 filed on May 20, 2008 including specification, drawings and claims is incorporated herein by reference in its entirety.

DESCRIPTION OF EMBODIMENTS

Figure 1:
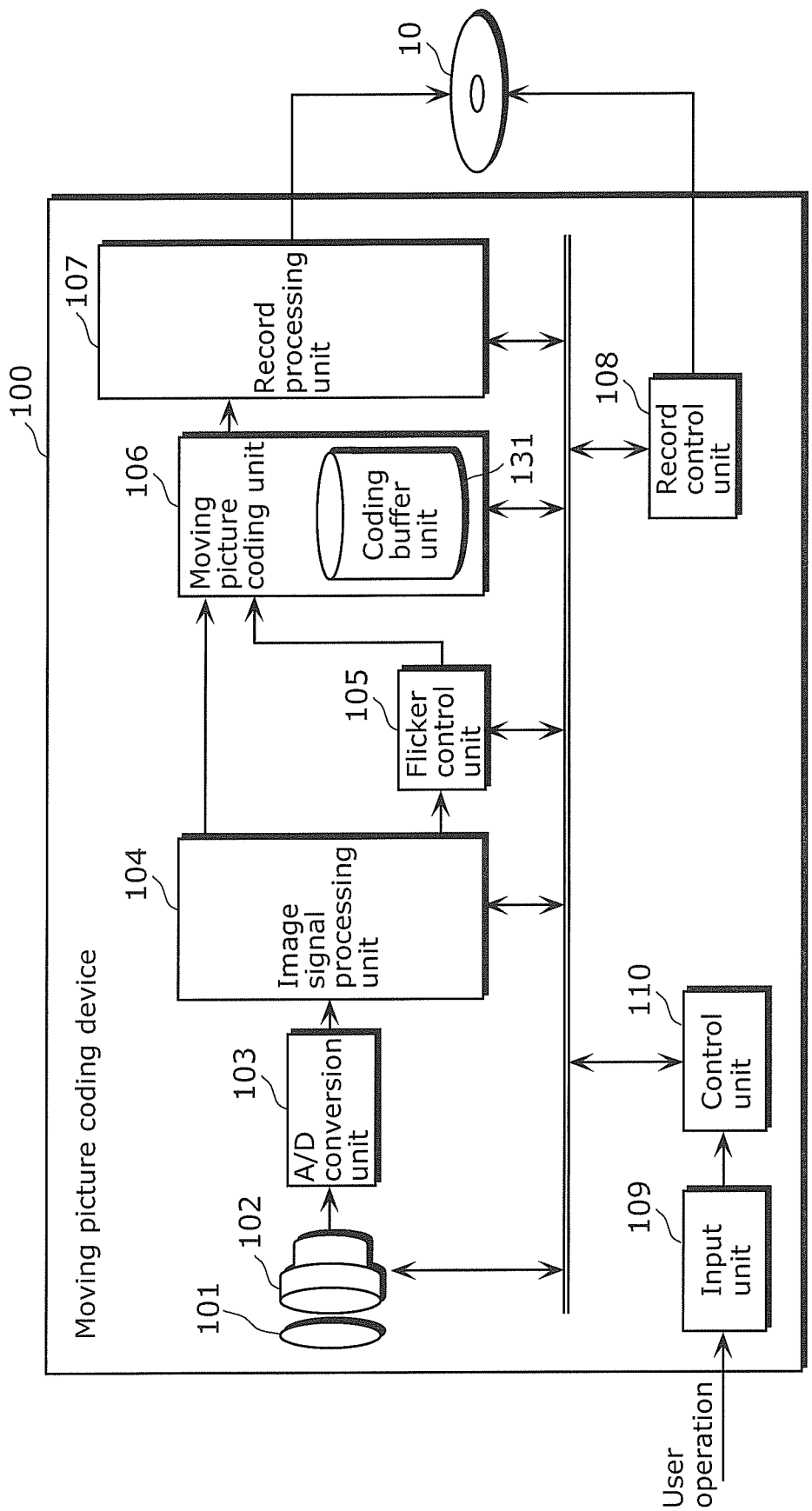
FIG. 1 is a block diagram showing a functional structure of a moving picture coding device according to Embodiment 1 of the present invention.

A moving picture coding device according to an embodiment of the present invention is characterized by including: a luminance information acquisition unit which acquires luminance information which indicates a luminance level of light in an environment where the object is captured; and a coding unit which codes the pictures, using a prediction coding method in which a picture type is applied in the coding of the pictures according to a flicker state of the light obtained from the luminance information.

With this, the coding is performed using the coding method according to the flicker state of the light obtained from the luminance information. In other words, the pictures are coded using the coding method according to the flicker state caused by flickers even when the flickers occur due to a light condition in an environment where an object is captured and a capturing cycle is significantly shorter than a flicker cycle. Consequently, the present invention produces advantageous effects of suppressing deterioration in coding efficiency caused by the flickers and achieving highly efficient coding.

Moreover, the moving picture coding device may further include a picture information acquisition unit which acquires picture information which indicates a bright picture obtained by capturing in a light state in the flicker state, wherein the coding unit codes the bright picture indicated by the picture information, using at least one of an intra-prediction coding method and a forward inter-prediction coding method which is performed with reference to a decoded picture of an other bright picture which is obtained by capturing prior to a capturing time of the bright picture.

With this, the picture coded by using at least one of the intra-prediction coding method and the forward inter-prediction coding method is the bright picture obtained by capturing with timing at which the lighting luminance is high. As a result, it is possible to increase a signal-to-noise power ratio of the bright picture even when the flickers occur due to the light condition in the environment where the pictures are obtained by capturing and the capturing cycle is significantly shorter than the flicker cycle. In addition, when bright pictures are obtained by capturing, lighting luminance at the time of capturing can be substantively considered as uniform among the bright pictures. Thus, the present invention produces an advantageous effect of achieving the highly efficient coding because correlations between the bright pictures are high.

Furthermore, the moving picture coding device may further include a capturing unit which captures the object in a predetermined capturing cycle, wherein the picture information acquisition unit identifies the bright picture among the pictures obtained by capturing in the predetermined capturing cycle, and acquires the picture information which indicates the bright picture.

With this, the object is captured in the predetermined capturing cycle, and the bright picture is identified among the pictures obtained by capturing in the predetermined capturing cycle. As a result, it is possible to increase a signal-to-noise power ratio of the bright picture cyclically identified, even when the flickers occur due to the light condition in the environment where the pictures are obtained by capturing and the capturing cycle is significantly shorter than the flicker cycle. In addition, lighting luminance at the time of capturing can be substantively considered as uniform between bright pictures cyclically identified. Thus, the present invention produces the advantageous effect of achieving the highly efficient coding because correlations between the bright pictures are high.

Moreover, the moving picture coding device may further include: a flicker cycle acquisition unit which acquires, from the luminance information acquired by the luminance information acquisition unit, a flicker cycle which is a cycle in which the light flickers; and a capturing cycle changing unit which changes the capturing cycle in which the capturing unit performs the capturing so that a period of the flicker cycle is equal to an integral multiple of a period of the capturing cycle.

With this, it is possible to fix the number of the pictures which are sandwiched between the bright pictures and which are coded by using the bi-directional inter-prediction coding method, and thus the present invention produces an advantageous effect of facilitating coding control.

Furthermore, the luminance information acquisition unit may acquire, as the luminance information, an average luminance value of the pictures obtained by capturing.

With this, the present invention produces an advantageous effect of obtaining the luminance information only from the information regarding the pictures obtained by capturing.

Moreover, the moving picture coding device may further include a lighting luminance photometry unit which performs photometry of lighting luminance of the light in the environment where the object is captured, wherein the luminance information acquisition unit acquires, as the luminance information, the lighting luminance.

With this, in comparison with a case of calculating luminance information based on pictures obtained by capturing in a flicker cycle, the present invention produces advantageous effects such as elimination of calculation of the average luminance value of the pictures and reduction in influence of change in the average luminance value caused by change of the object.

Furthermore, the coding unit may further code a picture other than the bright picture, using a weighted prediction coding method which is performed with reference to a decoded picture of the bright picture, the picture being included in the pictures obtained by capturing.

With this, a correlation between the picture to be coded other than the bright picture and a motion compensated predicted image generated by referring to the decoded picture of the bright picture is high, and thus the present invention produces an advantageous effect of enhancing the coding efficiency.

Moreover, the coding unit may perform the weighted prediction coding method by determining a weight based on a ratio between luminance information in the environment where the bright picture is obtained by capturing and luminance information in the environment where the picture to be coded other than the bright picture is obtained by capturing.

With this, an average luminance value between the picture to be coded other than the bright picture and the motion compensated predicted image generated by referring to the decoded picture of the bright picture is substantively the same, and thus the present invention produces the advantageous effect of enhancing the coding efficiency.

Furthermore, the coding unit may code a first bright picture in capturing order among the pictures included in a group of pictures which is a predetermined number of the pictures obtained by capturing, using the intra-prediction coding method.

With this, for instance, the group of pictures is determined as a GOP (Group of Pictures) prescribed in the MPEG-2 standard or the like, and thus a GOP structure is maintained. Consequently, the present invention produces an advantageous effect of performing coding.

Moreover, a moving picture coding method for coding a plurality of pictures obtained by capturing an object, the moving picture coding method including: acquiring luminance information which indicates a luminance level of light in an environment where the object is captured; and coding the pictures, using a prediction coding method in which a picture type is applied in the coding of the pictures according to a flicker state of the light obtained from the luminance information.

With this, the present invention produces advantageous effects of suppressing deterioration in coding efficiency caused by flickers and achieving highly efficient coding even when the flickers occur due to a light condition in an environment where pictures are obtained by capturing and a capturing cycle is significantly shorter than a flicker cycle.

Furthermore, a moving picture coding program for coding a plurality of pictures obtained by capturing an object, the moving picture coding program causing a computer to execute: acquiring luminance information which indicates a luminance level of light in an environment where the object is captured; and coding the pictures, using a prediction coding method in which a picture type is applied in the coding of the pictures according to a flicker state of the light obtained from the luminance information.

With this, the present invention produces, through the program, advantageous effects of suppressing deterioration in coding efficiency caused by flickers and achieving highly efficient coding even when the flickers occur due to a light condition in an environment where pictures are obtained by capturing and a capturing cycle is significantly shorter than a flicker cycle.

Moreover, a moving picture coding integrated circuit which codes a plurality of pictures obtained by capturing an object, the moving picture coding integrated circuit comprising: a luminance information acquisition unit which acquires luminance information which indicates a luminance level of light in an environment where the object is captured; and a coding unit which codes the pictures, using a prediction coding method in which a picture type is applied in the coding of the pictures according to a flicker state of the light obtained from the luminance information.

With this, the present invention produces, through the moving picture coding integrated circuit, advantageous effects of suppressing deterioration in coding efficiency caused by flickers and achieving highly efficient coding even when the flickers occur due to a light condition in an environment where pictures are obtained by capturing and a capturing cycle is significantly shorter than a flicker cycle.

It is to be noted that in the present invention a capturing cycle is represented by a period between capturing times of adjacent pictures. In other words, the capturing cycle is a multiplicative inverse of the number of pictures obtained by capturing per unit time. The unit time may be second, minute, or hour as a basic unit.

Moreover, a flicker cycle is represented by a period from a light state to another light state or a dark state to another dark state, in flickers caused by, for example, a power supply frequency of fluorescent lighting.

Furthermore, a bright picture refers to a picture obtained by capturing in a light state in a light condition in an environment where the moving picture coding device is located, such as a picture obtained by capturing in a light state, in flickers caused by, for example, a power supply frequency of fluorescent lighting.

The following describes embodiments with reference to the drawings.

Embodiment 1

FIG. 1 is a block diagram showing hardware components of a moving picture coding device 100 according to Embodiment 2 of the present invention.

Figure 2:
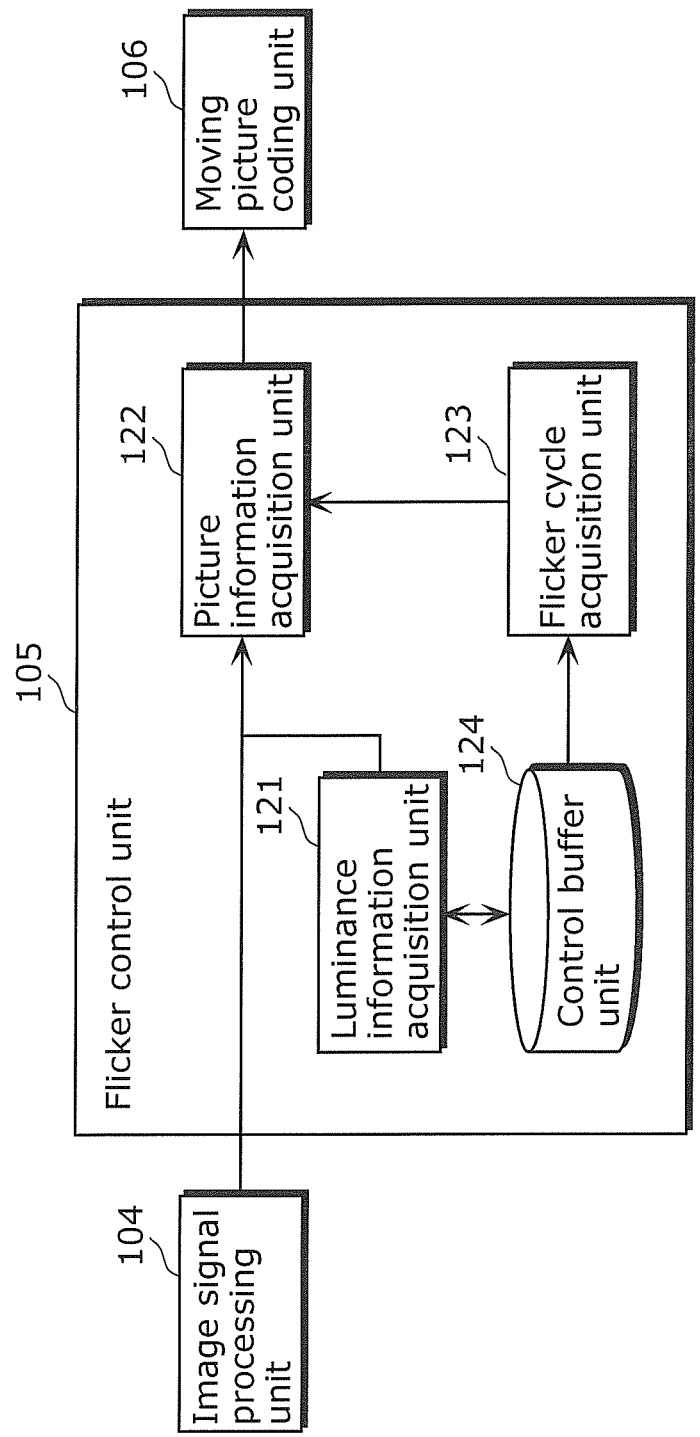
FIG. 2 is a block diagram showing a functional structure of a flicker control unit according to Embodiment 1 of the present invention.

FIG. 2 is a block diagram showing a functional structure of a flicker control unit 105 according to Embodiment 1 of the present invention.

It is to be noted that although it is assumed here that the moving picture coding device 100 according to Embodiment 1 of the present invention obtains interlace scan image by capturing at a frame rate of 480 fields per second under fluorescent lamp lighting having a 60-Hz power supply frequency, the moving picture coding device 100 is not limited to the above structure, and may obtain images by capturing in any capturing cycle.

As shown in FIG. 1, the moving picture coding device 100 includes a lens group 101, a capturing unit 102, an A/D conversion unit 103, an image signal processing unit 104, a flicker control unit 105, a moving picture coding unit 106, a record processing unit 107, a record control unit 108, an input unit 109, and a control unit 110.

The input unit 109 receives via an input device a user operation such as setting of a capturing cycle in the capturing unit 102. The input unit 109 then provides, to the control unit 110, the received user operation as operation information. The user operation received by the input unit 109 is inputted by using, for example, a touchpad input device, a pointing device, and a tablet.

The control unit 110 controls the capturing unit 102, the image signal processing unit 104, the flicker control unit 105, the moving picture coding unit 106, the record processing unit 107, and the record control unit 108, and performs record processing and the like in the moving picture coding device 100. The control unit 110 may be implemented by, for instance, a CPU which can execute software.

The lens group 101 includes optical lenses.

The capturing unit 102 captures an object in a predetermined capturing cycle. More specifically, the capturing unit 102 includes, for example, imaging elements such as CCD elements, and captures the object via the lens group 101. Furthermore, the capturing cycle at a time when the capturing unit 102 performs capturing is specified via the control unit 110 based on the operation information provided from the input unit 109 to the control unit 110.

The capturing unit 102 then provides, as an analog signal, the image obtained by capturing to the A/D conversion unit 103. It is to be noted that the capturing unit 102 is not limited to a structure having the CCD elements, and may include a structure having CMOS elements. Using the CMOS elements makes it possible to reduce power consumption.

The A/D conversion unit 103 converts the analog signal provided by the capturing unit 102 into a digital signal. The A/D conversion unit 103 then provides the digital signal obtained through the conversion to the image signal processing unit 104.

The image signal processing unit 104 performs noise removal or processing such as picture quality adjustment on the digital signal provided from the A/D conversion unit 103, and then provides an interlace scan image obtained by capturing at a frame rate of 480 fields per second (hereinafter, referred to as 480i image) to the flicker control unit 105 and the moving picture coding unit 106.

The flicker control unit 105 provides, as flicker information, (i) presence or absence of flickers caused by a light condition of an environment where the moving picture coding device is located and (ii) picture information about a bright picture among pictures included in the 480i image, to the moving picture coding unit 106, based on the provided 480i image.

More specifically, as shown in FIG. 2, the flicker control unit 105 includes a luminance information acquisition unit 121, a picture information acquisition unit 122, a flicker cycle acquisition unit 123, and a control buffer unit 124.

The luminance information acquisition unit 121 acquires luminance information which indicates a luminance level of light in an environment where an object is captured. More specifically, the luminance information acquisition unit 121 acquires an average luminance value of an image obtained by capturing.

Still more specifically, the luminance information acquisition unit 121 calculates an average luminance value for each of the pictures included in the 480i image as an average value of luminance values based on pixel values of each picture, and stores, into the control buffer unit 124 included in the flicker control unit 105, the calculated average luminance value in capturing order.

When the average luminance values stored in the control buffer unit 124 cyclically have a local maximum or minimum value, the luminance information acquisition unit 121 determines that flickers occur, and provides the picture information as flicker information via the picture information acquisition unit 122 to the moving picture coding unit 106.

The flicker cycle acquisition unit 123 acquires, from the luminance information acquired by the luminance information acquisition unit 121, a flicker cycle which is a cycle in which light flickers. More specifically, when the average luminance values stored in the control buffer unit 124 cyclically have the local maximum or minimum value, the flicker cycle acquisition unit 123 calculates the flicker cycle based on a picture interval of pictures having the local maximum or minimum value.

The picture information acquisition unit 122 acquires picture information indicating a bright picture obtained by capturing in a light state in a flicker state of the light in the environment where the object is captured, the picture information being obtained from the luminance information acquired by the luminance information acquisition unit 121. More specifically, the picture information acquisition unit 122 identifies the bright picture among the pictures obtained by capturing in the capturing cycle, and acquires the picture information indicating the bright picture.

Still more specifically, the picture information acquisition unit 122 determines the picture having the local maximum value as the bright picture obtained by capturing when a light condition of an environment where the moving picture coding device is located is bright, and acquires the picture information about the picture. The picture information acquisition unit 122 then provides the picture information about the bright picture as the flicker information to the moving picture coding unit 106.

It is to be noted that the picture information may be any information which enables unique identification of a picture. For instance, it may be information about a capturing time of obtaining a picture by capturing or information included in a header of a picture. It is to be noted that although the average luminance value of each picture is calculated when calculating the luminance of the picture, for example, a partial average luminance value of a picture may be calculated.

Furthermore, although the control buffer unit 124 is a recording medium such as a nonvolatile memory and is included in the flicker control unit 105, the control buffer unit 124 may be disposed outside of the flicker control unit 105.

Moreover, although when the average luminance values of the picture cyclically have the local maximum or minimum value, a method for determining presence or absence of flickers determines that the flickers occur, the present invention is not limited to the above method. Any conventionally-used method for detecting a flicker may be employed.

Referring back to FIG. 1, the moving picture coding unit 106 codes a picture, using a prediction coding method in which a picture type is applied in the coding of the picture according to the flicker state of the light obtained from the luminance information acquired by the luminance information acquisition unit 121. It is to be noted that the moving picture coding unit 106 corresponds to a "coding unit" in claims.

More specifically, on the basis of the flicker information provided from the flicker control unit 105, the moving picture coding unit 106 compresses the 480i image provided from the image signal processing unit 104 as an interlace scan image obtained by capturing at a frame rate of 60 fields per second (hereinafter, referred to as 60i image) based on the MPEG-2 standard, a compression standard, or a coding method such as the H.264 standard, and multiplexes attribute information or an audio signal (not shown) based on a multiplex method such as the MPEG-2 Systems. The moving picture coding unit 106 then provides a moving picture file obtained through the multiplexing to the record processing unit 107.

Furthermore, the moving picture coding unit 106 internally includes a coding buffer unit 131 for accumulating (i) a decoded picture of a bright picture referred to by other pictures in coding and (ii) a picture of which coding cannot be started until the next bright picture in capturing order is coded. The coding buffer unit 131 is a recording medium such as a nonvolatile memory.

The compression method in the moving picture coding unit 106 is a method for coding the bright picture indicated by the flicker information, using at least one of (i) an intra-prediction coding method and (ii) a forward inter-prediction coding method which is performed with reference to a decoded picture of an other bright picture which was obtained by capturing prior to an capturing time of the bright picture accumulated in the coding buffer unit 131 and which was coded.

More specifically, the moving picture coding unit 106 codes the first bright picture in capturing order among the pictures included in a group of pictures which is a predetermined number of pictures obtained by capturing, using the intra-prediction coding method. The group of pictures is, for instance, GOP. It is to be noted that the number of pictures included in the group of pictures needs not be fixed, and may vary for each of groups of pictures.

Moreover, after a picture other than the bright picture is accumulated in the coding buffer unit 131 until the next bright picture in capturing order which is referred to in coding is coded, the moving picture coding unit 106 codes the picture, using a bi-directional inter-prediction coding method which is performed with reference to (i) a decoded picture of a bright picture which was obtained by capturing prior to the picture to be coded and (ii) a decoded picture of another bright picture which was obtained by capturing posterior to the picture to be coded.

In this case, since the picture coded by using the intra-prediction coding method or the forward inter-prediction coding method is a picture obtained by capturing with timing at which lighting luminance is high, a signal-to-noise power ratio is high, and since the lighting luminance at a time of capturing can be substantively considered as uniform, correlations between pictures are high. As a result, the present invention produces an advantageous effect of enabling highly efficient coding. It is to be noted that the 480i image thus coded as the 60i image can be decoded and reproduced as the 60i image at a speed eight times slower.

The record processing unit 107 writes the moving picture file provided from the moving picture coding unit 106 into a recording medium 10 according to file composition set in the above compression standard. It is to be noted that the recording medium 10 may be a recording device included in the moving picture coding device 100 such as a hard disk drive or may have a structure in which a removable semiconductor memory such as an SD card is used.

The record control unit 108 controls a drive device which drives the recording medium 10 or record protocols such as a recording address input procedure.

The following describes an operation in which flicker information is used in the moving picture coding device 100 according to Embodiment 1 of the present invention with reference to the drawings.

Figure 3:
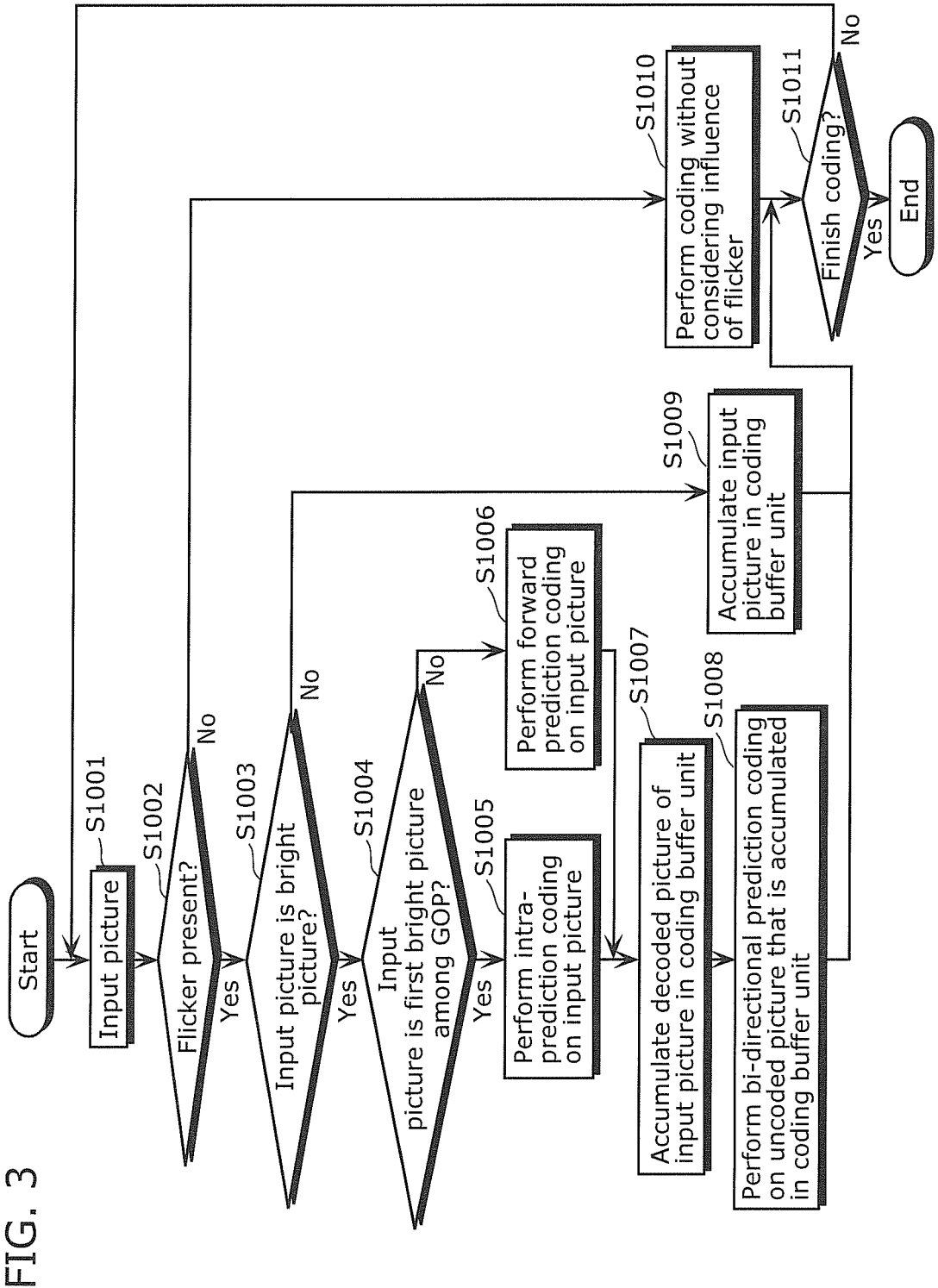
FIG. 3 is a flowchart showing an operating procedure of a moving picture coding device according to Embodiment 1 of the present invention.
Figure 4:
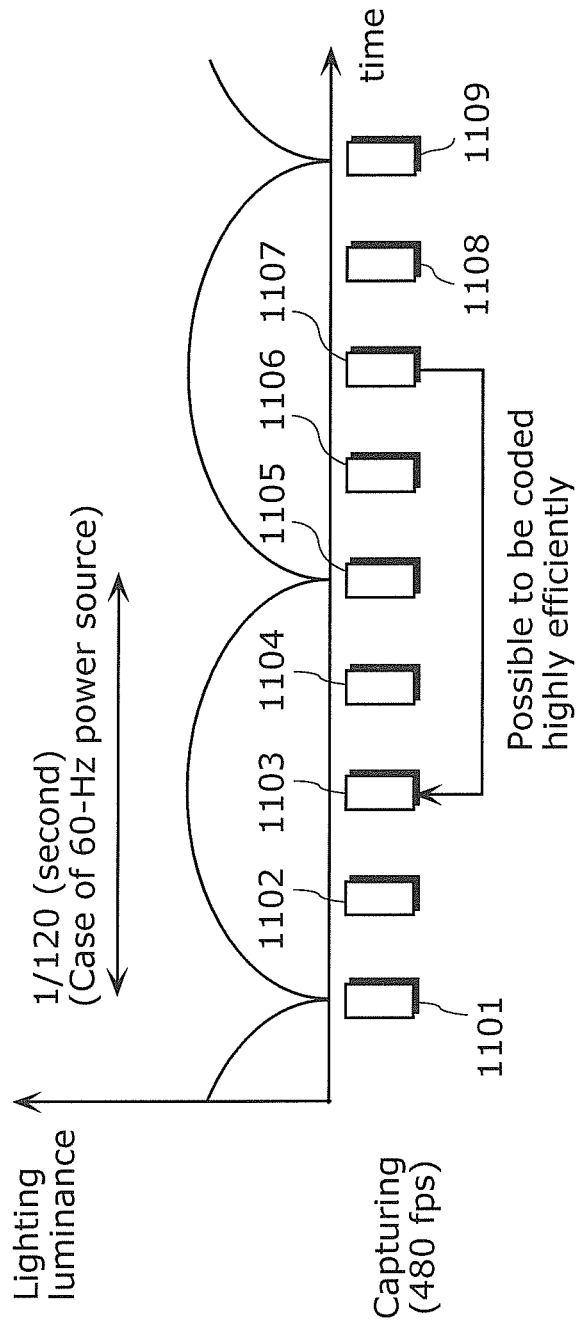
FIG. 4 is a diagram showing a moving picture coding method in a moving picture coding device according to Embodiment 1 of the present invention.

FIG. 3 is a flowchart showing picture coding at a time when the moving picture coding device 100 captures an object. FIG. 4 is a diagram showing a moving picture coding method in the moving picture coding device 100.

(Step S1001) The moving picture coding device 100 captures an object. When obtaining a 480i image through the image signal processing unit 104, the moving picture coding device 100 provides the 480i image to the flicker control unit 105 and the moving picture coding unit 106. The processing proceeds to step S1002.

(Step S1002) When the image signal processing unit 104 inputs an input picture to the flicker control unit 105, the luminance information acquisition unit 121 acquires luminance information and stores the luminance information into the control buffer unit 124. The luminance information acquisition unit 121 calculates an average luminance value of the input picture from the luminance information, and determines whether or not a flicker is present in the currently inputted input picture based on the calculated average luminance value and average luminance values of past input pictures stored in the control buffer unit 124 in capturing order. When it is determined that the flicker has occurred, the processing proceeds to step S1003. On the other hand, when it is determined that the flicker has not occurred, the processing proceeds to step S1010.

(Step S1003) When it is determined that the flicker has occurred in the input picture, the flicker cycle acquisition unit 123 then acquires a flicker cycle. Next, the picture information acquisition unit 122 determines whether or not the input picture is a bright picture based on a picture interval of pictures which have a local maximum average luminance value and are stored in capturing order. When it is determined that the input picture is the bright picture, the processing proceeds to step S1004. On the other hand, when it is determined that the input picture is not the bright picture, the processing proceeds to step S1009.

For example, as shown in FIG. 4, when a 480i image is obtained by capturing in a capturing cycle of $1;480$ seconds under fluorescent lamp lighting having a 60-Hz power supply frequency, pictures which are included in the 480i image and have local maximum average luminance values are a picture 1103 and a picture 1107. In other words, the flicker cycle is $1;120$ seconds of four picture units. Furthermore, when it is determined that the input picture is the bright picture, the picture information acquisition unit 122 provides, to the moving picture coding unit 106, picture information of the pictures 1103 and 1107 of which the average luminance values are the local maximum value, as the flicker information.

(Step S1004) When it is determined that the input picture is the bright picture, the moving picture coding unit 106 determines whether or not the input picture is the first bright picture in capturing order in each GOP. When it is determined that the input picture is the first bright picture in the GOP, the processing proceeds to step S1005. On the other hand, when it is determined that the input picture is not the first bright picture in capturing order in the GOP, the processing proceeds to step S1006.

(Step S1005) When it is determined that the input picture is the first bright picture in the GOP, the moving picture coding unit 106 codes the input picture, using the intra-prediction coding method. The processing further proceeds to step S1007.

(Step S1006) When it is determined that the input picture is not the first bright picture in capturing order in the GOP, the moving picture coding unit 106 codes the input picture, using the forward inter-prediction coding method which is performed with reference to a decoded picture of a bright picture which is accumulated in the coding buffer unit 131 and of which capturing time precedes a capturing time of the input picture. The processing further proceeds to step S1007.

(Step S1007) Since the input picture coded in step S1006 may be referred to in coding other pictures, a decoded picture of the input picture is accumulated in the coding buffer unit 131. The processing further proceeds to step S1008.

(Step S1008) The moving picture coding unit 106 codes uncoded pictures, using the bi-directional inter-prediction coding method which is performed with reference to the decoded picture of the input picture accumulated in the coding buffer unit 131, the uncoded pictures being previously inputted and accumulated in the coding buffer unit 131. The processing then proceeds to step S1011.

(Step S1009) On the other hand, when it is determined that the input picture is not the bright picture, the moving picture coding unit 106 accumulates the input picture in the coding buffer unit 131. The processing then proceeds to step S1011.

(Step S1010) Moreover, when it is determined that the flicker has not occurred in the input picture, the moving picture coding unit 106 codes the input picture without considering the influence of the flicker. The processing then proceeds to step S1011.

(Step S1011) It is then determined whether to finish the coding process based on the control performed by the control unit 110. When the coding process is continued, the processes subsequent to step S1001 are performed again.

It is to be noted that although the flicker control unit 105 calculates the luminance information based on the picture provided from the image signal processing unit 104 in the moving picture coding device 100 in Embodiment 1, the moving picture coding device 100 may include a lighting luminance photometry unit.

Figure 5:
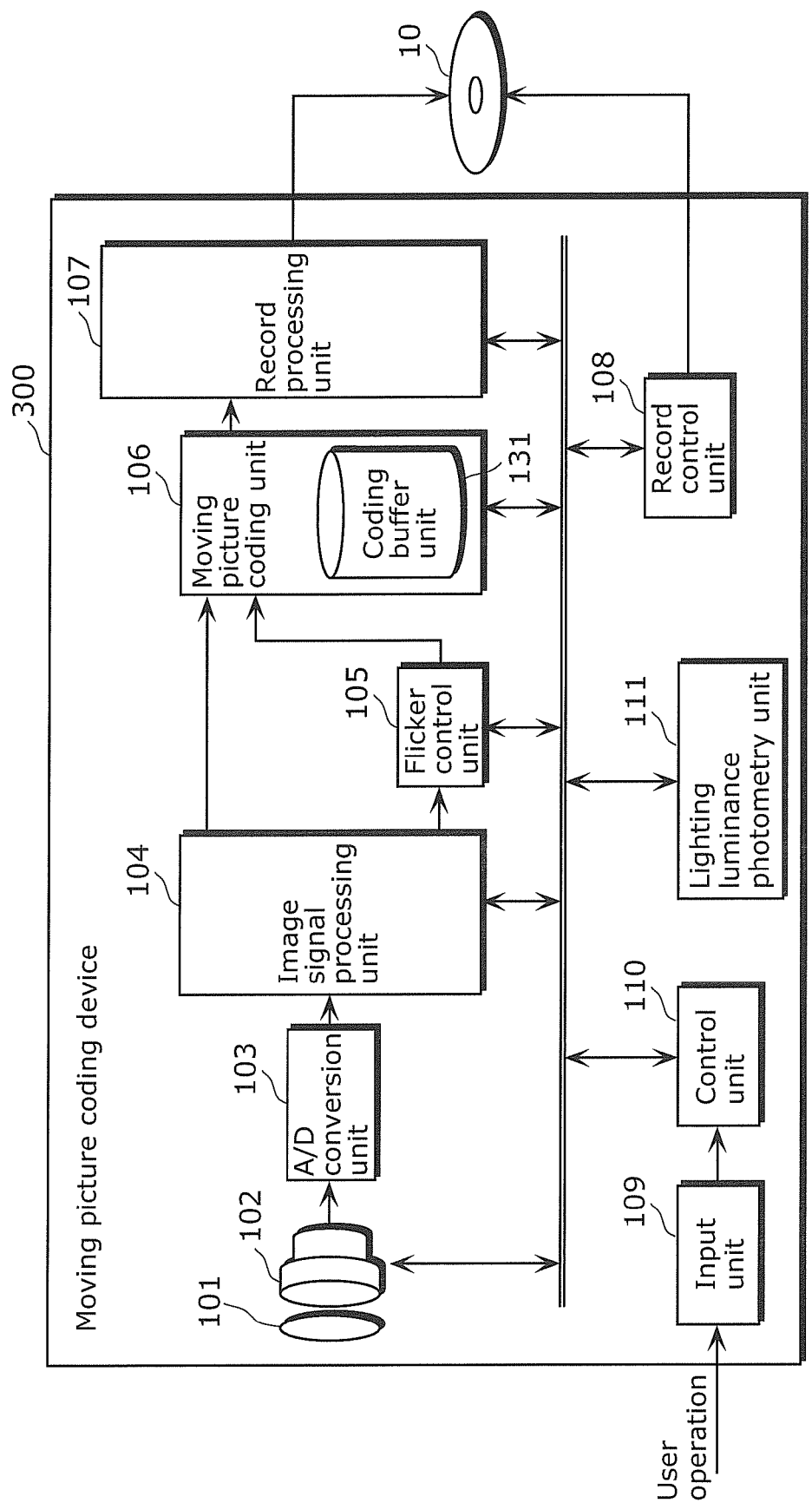
FIG. 5 is a block diagram showing a functional structure of a moving picture coding device including a lighting luminance photometry unit according to Embodiment 1 of the present invention.

FIG. 5 is a block diagram showing a functional structure of a moving picture coding device 300 including a lighting luminance photometry unit 111.

As shown in the diagram, the moving picture coding device 300 includes the lighting luminance photometry unit 111 which includes, for instance, an optical sensor.

The lighting luminance photometry unit 111 performs photometry of lighting luminance of light in an environment where an object is captured.

Then, the luminance information acquisition unit 121 of the flicker control unit 105 shown in FIG. 2 acquires, as the luminance information, the lighting luminance obtained through the photometry performed by the lighting luminance photometry unit 111. In other words, the luminance information acquisition unit 121 calculates the luminance information based on the result of the photometry of the lighting obtained by the lighting luminance photometry unit 111.

As stated above, in the case of calculating the luminance information based on the result of the photometry of the lighting, in comparison with a case of calculating luminance information based on a picture included in a flicker cycle, it is expected that the present invention produces advantageous effects such as elimination of calculation of an average luminance value of pictures and reduction in influence of change in the average luminance value of the pictures caused by change of an object to be captured.

Furthermore, the moving picture coding unit 106 may code pictures other than a bright picture having the maximum average luminance value, among pictures in each of flicker cycles, using the inter-prediction coding method in which weighted coding is performed with reference to a decoded picture of the bright picture, A weight used in coding can be calculated from, for example, a ratio between an average luminance value in an environment where a bright picture which is a reference picture is obtained by capturing and an average luminance value in an environment where a picture to be coded other than the bright picture is obtained by capturing.

More specifically, where an average luminance value of a picture to be coded is p, an average luminance value of a previous picture is q0, an average luminance value of a subsequent picture is q1, a weight coefficient to be multiplied with a motion compensated predicted image to be generated from the previous picture is W0, and a weight coefficient to be multiplied with a motion compensated predicted image to be generated from the subsequent picture is W1, $W0=p/2q0$ and $W1=p/2q1$ may hold, the previous picture temporally preceding the picture to be coded and being a picture having a luminance value greater than a predetermined threshold value, and the subsequent picture being temporally preceded by the picture to be coded and being a picture having a luminance value greater than a predetermined threshold value.

The average luminance value of the motion compensated predicted image generated through the multiplication of such weight coefficients is determined by $W0 \times q0+W1 \times q1=p$, and becomes substantially equal to the average luminance value of the picture to be coded. As a result, since a correlation between the picture to be coded and the motion compensated predicted image is high, it is possible to enhance coding efficiency.

Moreover, although the moving picture coding device 100 provides the image obtained by capturing simultaneously to the flicker control unit 105 and the moving picture coding unit 106, the image may be accumulated in the flicker control unit 105 and a frame buffer unit disposed at a location different from that of the moving picture coding unit 106, and the moving picture coding unit 106 may perform coding after the flicker control unit 105 determines presence or absence of a flicker in terms of the image accumulated in the frame buffer unit.

The moving picture coding device 100 according to Embodiment 1 codes the bright picture (e.g., the picture 1103 or 1107 shown in FIG. 4) obtained by capturing in the light state in the flicker state of the light in the environment where the image is obtained by capturing, using the intra-prediction coding method or the forward inter-prediction coding which is performed with reference to the decoded picture of the other bright picture which had been obtained by capturing prior to the bright picture and which was coded, based on the flicker information detected by the flicker control unit 105.

With this, since the picture coded by using the intra-prediction coding method or the forward inter-prediction coding method has been obtained by capturing with timing at which lighting luminance is high, and since the lighting luminance at a time of capturing can be substantially considered as uniform, correlations between pictures are high. Consequently, it is possible to suppress the deterioration in the coding efficiency caused by flickers. Furthermore, since coding efficiency of a reference picture is high and a signal-to-noise power ratio is increased, it is possible to suppress the deterioration in the coding efficiency caused by the flickers for a picture to be coded (e.g., the picture 1104, 1105, or 1106 shown in FIG. 4) with reference to the decoded picture of the picture coded by using the intra-prediction coding method or the forward inter-prediction coding method.

It is to be noted that the number of pictures coded by using the intra-prediction coding method or the forward inter-prediction coding method which is performed with reference to the decoded picture of the picture needs not be fixed for each flicker cycle, and may vary for each flicker cycle. Even in this case, since the signal-to-noise power ratio of the picture is increased, it is possible to suppress the deterioration in the coding efficiency caused by the flickers.

(Embodiment 2)

The following describes a moving picture coding device 200 according to Embodiment 2 of the present invention with reference to the drawings. A difference between the moving picture coding device 200 according to Embodiment 2 and the moving picture coding device 100 according to Embodiment 1 is that a specified capturing cycle which the control unit 210 receives from the input unit 109 is limited based on the flicker cycle calculated by the flicker control unit 105.

Figure 6:
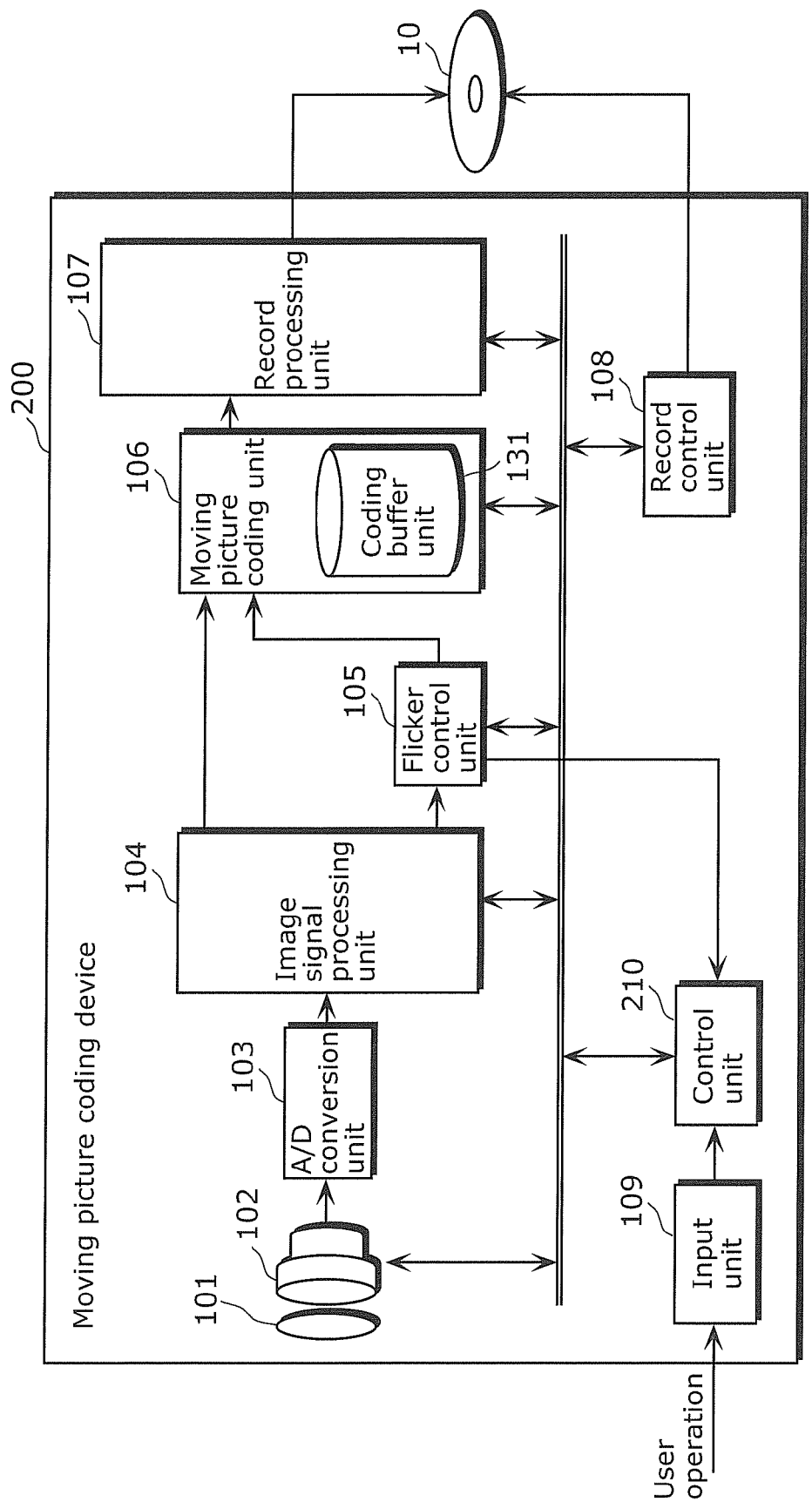
FIG. 6 is a block diagram showing a functional structure of a moving picture coding device according to Embodiment 2 of the present invention.

FIG. 6 is a block diagram showing hardware components of the moving picture coding device 200 according to Embodiment 2 of the present invention. It is to be noted that the same numerals are assigned to the same hardware components as the hardware components of the moving picture coding device 100 according to Embodiment 1, and detailed description thereof is omitted.

Figure 7:
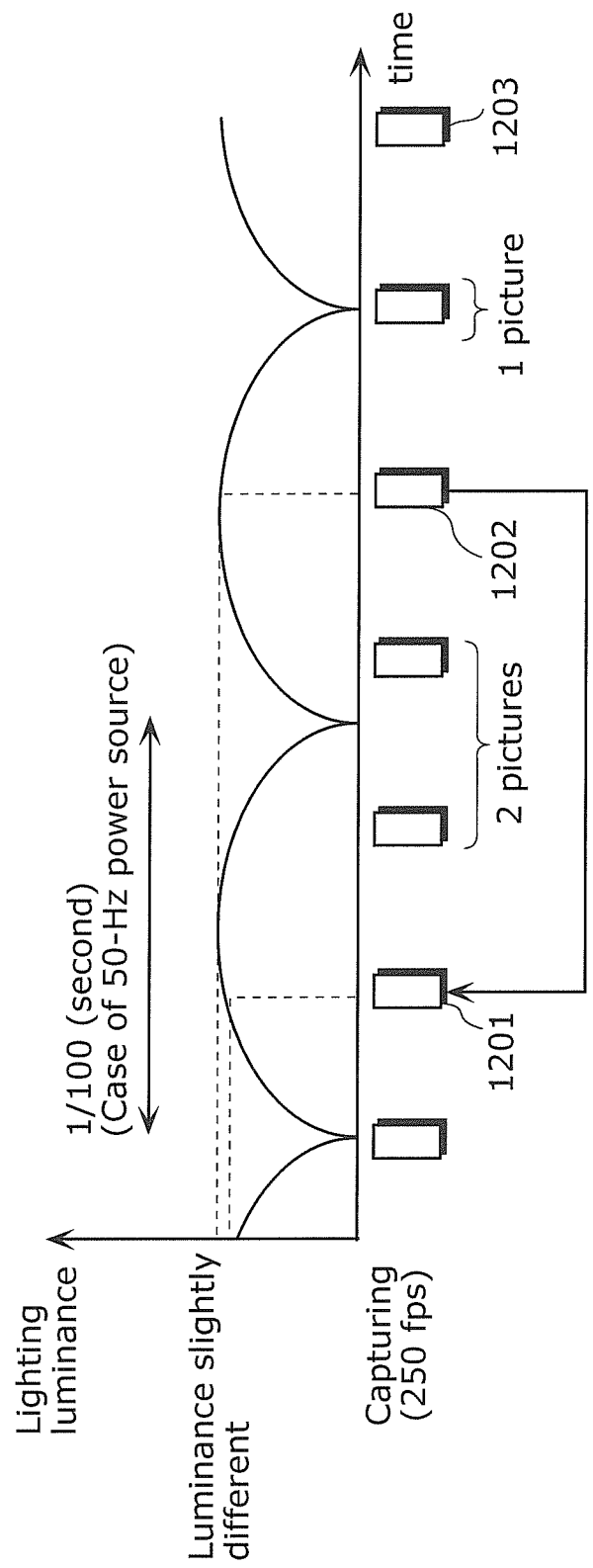
FIG. 7 is a diagram showing a moving picture coding method when a period of a flicker cycle is not equal to the integral multiple of a period of a capturing cycle according to Embodiment 2 of the present invention.

FIG. 7 is a diagram showing a moving picture coding method when a period of a flicker cycle is not equal to the integral multiple of a period of a capturing cycle according to Embodiment 2 of the present invention. More specifically, the diagram shows a coding method when capturing at a rate of 250 fields per second is performed under fluorescent lamp lighting having a 50-Hz power supply frequency.

In other words, the period of the flicker cycle is /1;100 seconds, and the period of the capturing cycle is /1;250 seconds. As stated above, when the period of the flicker cycle is not equal to the integral multiple of the period of the capturing cycle (2.5 times in the case of the diagram), an average luminance value between pictures 1201 and 1202 having the maximum average luminance value, among pictures in each flicker cycle, is not equal to or below a predetermined error. For this reason, correlations between pictures are low, and there is a possibility of causing deterioration in coding efficiency.

Furthermore, as shown in the diagram, while there are two pictures between the pictures 1201 and 1202, there is one picture between the picture 1202 and a picture 1203. As stated above, the number of pictures is not fixed which are sandwiched between pictures coded by using an intra-prediction coding method or a forward inter-prediction coding method and which are coded by using a bi-directional inter-prediction coding method, and coding control becomes complicated.

The control unit 210 of the moving picture coding device 200 according to Embodiment 2 of the present invention limits, based on a flicker cycle calculated by the flicker cycle acquisition unit 123 of the flicker control unit 105, a specified capturing cycle received from the input unit 109 so that the period of the flicker cycle is equal to the integral multiple of the period of the capturing cycle.

As stated above, the control unit 210 performs control so that the period of the flicker cycle is equal to the integral multiple of the period of the capturing cycle, and thus the lighting luminance at the time of capturing becomes substantially uniform between the pictures having the maximum average luminance value, among the pictures in each flicker cycle. Consequently, the present invention produces the advantageous effect of suppressing the deterioration in the coding efficiency caused by the flickers.

Moreover, performing the above control fixes the number of the pictures which are sandwiched between the pictures coded by using the intra-prediction coding method or the forward inter-prediction coding method and which are coded by using the bi-directional inter-prediction coding method. As a result, the present invention produces an advantageous effect of facilitating the coding control.

It is to be noted that when a pre-specified capturing cycle is not a cycle such that a period of a flicker cycle is the integral multiple of a period of a capturing cycle, the control unit 210 may urge, through user interface such as a display, a user to change the capturing cycle.

In addition, the control unit 210 may automatically change the capturing cycle.

Figure 8:
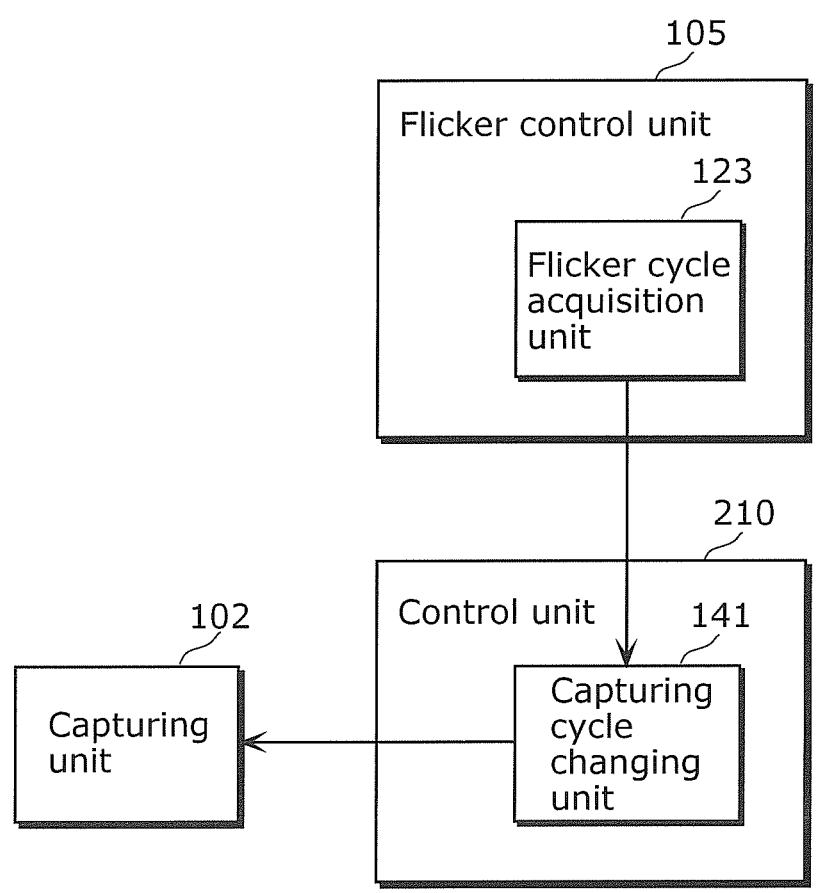
FIG. 8 is a block diagram showing a functional structure of a control unit which changes a capturing cycle according to a modification of Embodiment 2 of the present invention.

FIG. 8 is a block diagram showing a functional structure of the control unit 210 which changes a capturing cycle in a modification of Embodiment 2 of the present invention.

As shown in the diagram, the control unit 210 includes a capturing cycle changing unit 141.

The capturing cycle changing unit 141 changes a capturing cycle in which the capturing unit 102 performs capturing so that a period of a flicker cycle acquired by the flicker cycle acquisition unit 123 is the integral multiple of a period of the capturing cycle.

As stated above, the moving picture coding device 200 according to Embodiment 2 limits the specified capturing cycle received from the input unit 109 to a cycle so that the period of the flicker cycle is the integral multiple of the period of the capturing cycle, based on the flicker cycle calculated by the flicker control unit 105.

With this, the lighting luminance at the time of capturing becomes substantially uniform between the pictures obtained by capturing in the light state in the flicker state of the light in the environment where the pictures are obtained by capturing, and thus the present invention produces the advantageous effect of suppressing the deterioration in the coding efficiency caused by the flickers. In addition, it is possible to fix the number of the pictures which are sandwiched between the bright pictures and which are coded by using the bi-directional inter-prediction coding method, and thus the present invention produces the advantageous effect of facilitating the coding control.

The following describes in detail the advantageous effects of the moving picture coding device according to the present embodiment of the present invention.

Figure 9:
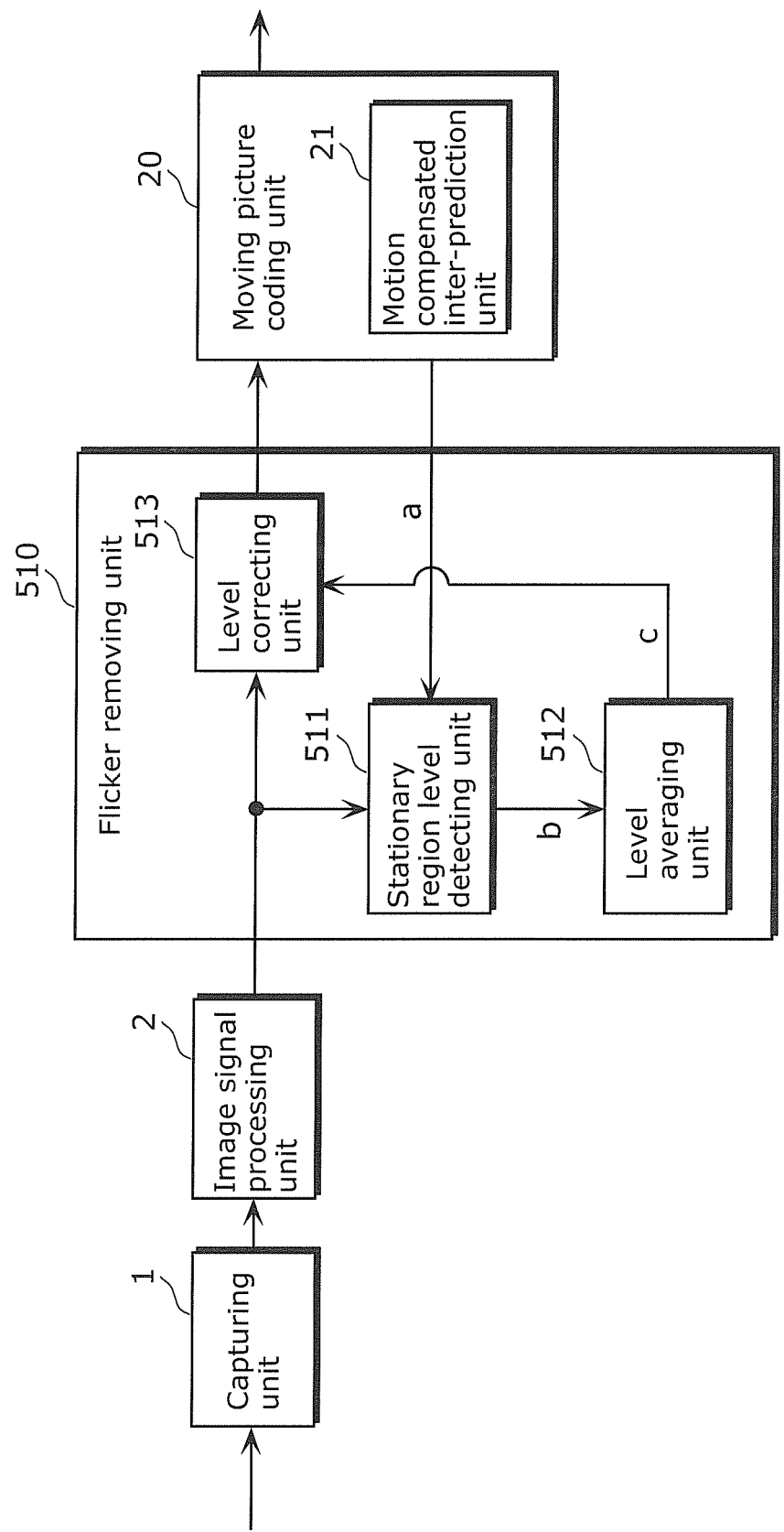
FIG. 9 is a block diagram showing a functional structure of a conventional moving picture coding device.

First, an overview of operations of a conventional moving picture coding device is described with reference to FIG. 9. It is to be noted that the figure is a block diagram showing a functional structure of the conventional moving picture coding device. Furthermore, here taking a case of performing frame coding as an example, the overview of the operations of the moving picture coding device is described.

First, a light signal incident on the capturing unit 1 is converted into an electric signal, the electric signal is further converted by the image signal processing unit 2 into an image signal, and then the image signal is provided to a flicker removing unit 510 on a predetermined block basis defined by a coding system. The image signal on a predetermined block basis is provided through a level correcting unit 513 to a moving picture coding unit 20 in a subsequent stage. Here, a motion compensated inter-prediction unit 21 of the moving picture coding unit 20 detects, on a block basis, a dynamic region and a stationary region of an object between a current frame and a previous frame of the image signal. The dynamic region and the stationary region are determined based on a change in a signal level between the current frame and the previous frame. When a level change amount is equal to or below a threshold value, the block is determined to be stationary. On the other hand, when the level change amount is above the threshold value, the block is determined to be dynamic.

Although it is difficult to determine whether a change in a level of a dynamic region having a large level change amount is caused by motion of the object or noise such as the flickers, it is possible to determine that a very small change in a level of a stationary region having a small level change amount results from the noise such as the flickers because the object is determined to be nothing but stationary.

A stationary region level detecting unit 511 detects a signal level of a stationary region to provide a block signal level b, based on stationary region position information a provided by the motion compensated inter-prediction unit 21. The block signal level b is accumulated in a level averaging unit 512 for one image frame, and then an average value c is calculated. When the noise such as the flickers is superimposed, a level difference between the average value c thus calculated and a stationary region of a current frame may be a plus or minus value with respect to zero. The level correcting unit 513 removes noise components from a signal level in the frame by calculating the level difference between the average value c calculated by the level averaging unit 512 and the stationary region of the current frame. Data per block from which the noise such as the flickers is removed is coded in the moving picture coding unit 20.

However, the above conventional technique has a problem that there is a case where it is not possible to suppress the deterioration in the coding efficiency caused by the flickers because it is difficult to remove the noise components caused by the flickers.

In other words, when the flickers occur due to a light condition in an environment where an object is captured and where capturing is performed in a capturing cycle which is significantly shorter than a flicker cycle, an average luminance value between each of images significantly differs. For this reason, the conventional technique makes it difficult to differentially correct the signal level and remove the noise components caused by the flickers because a difference in signal level between video signals becomes too large.

In particular, when noise components caused by flickers cannot be removed from an image obtained by capturing with timing at which lighting luminance is low, a signal-to-noise power ratio of the image is decreased. To put it differently, it is impossible to suppress the deterioration in the coding efficiency caused by the flickers.

As stated above, when the capturing cycle is significantly shorter than the flicker cycle, the above conventional technique has the problem that there is the case where it is not possible to suppress the deterioration in the coding efficiency caused by the flickers because it is difficult to remove the noise components caused by the flickers.

Figure 10:
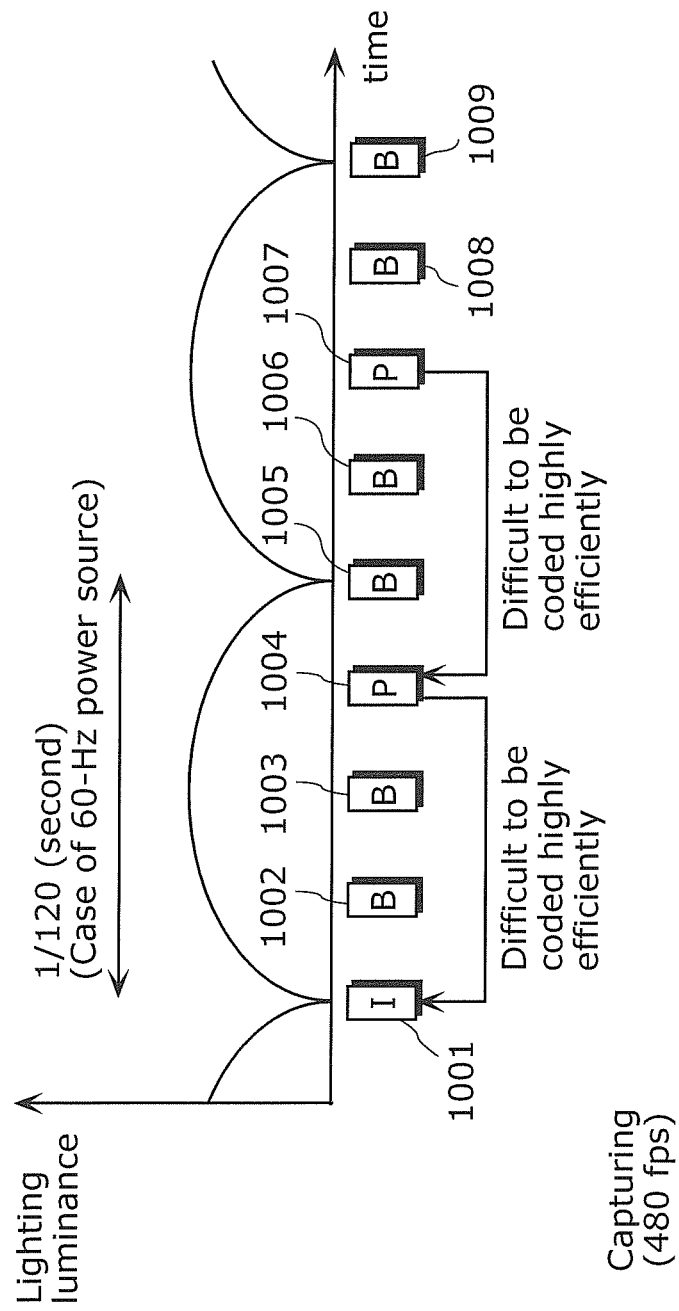
FIG. 10 is a diagram showing a moving picture coding method in a conventional moving picture coding device.

FIG. 10 is a diagram showing a moving picture coding method in a conventional moving picture coding device. More specifically, the diagram shows a coding method when the conventional moving picture coding device performs capturing at a rate of 480 fields per second under fluorescent lamp lighting having a 60-Hz power supply frequency.

In the diagram, an I-picture 1001 is a picture to be coded by using the intra-prediction coding method, P-pictures 1004 and 1007 are pictures to be coded by using the forward inter-prediction coding method, and B-pictures 1002, 1003, 1005, 1006, 1008, and 1009 are pictures to be coded by using the bi-directional inter-prediction coding method.

Here, it is assumed that the P-picture 1004 is coded with reference to the I-picture 1001 and that the P-picture 1007 is coded with reference to the P-picture 1004. It is also assumed that the B-pictures 1002 and 1003 are coded with reference to the I-picture 1001 and the P-picture 1004 and that the B-pictures 1005 and 1006 are coded with reference to the P-pictures 1004 and 1007.

As shown in the diagram, when the I-picture 1001 which is obtained by capturing with timing at which lighting luminance is low and which has a low signal-to-noise power ratio is coded by using the intra-prediction coding method, a correlation between pictures is low and high efficient coding is difficult for the P-picture 1004 coded by using the forward inter-prediction coding method which is performed with reference to the I-picture 1001 because many noise components are included in the I-picture 1001 to be referred to and lighting luminance at a time of capturing differs between the I-picture 1001 and the P-picture 1004.

Moreover, a correlation between pictures is low and highly efficient coding is difficult for the P-picture 1007 because many noise components are included in a decoded picture of the P-picture 1004 to be referred to due to low coding efficiency of the P-picture 1004 and lighting luminance at a time of capturing differs between the P-picture 1004 and the P-picture 1007.

Furthermore, likewise, highly efficient coding is difficult for a picture coded by using the bi-directional inter-prediction coding method which is performed with reference to pictures coded by using the intra-prediction coding method or the forward inter-prediction coding method.

Even when the flickers occur due to the light in the environment where the image is obtained by capturing and the capturing cycle is significantly shorter than the flicker cycle, the moving picture coding device according to the present embodiment of the present invention makes it possible to suppress the deterioration in the coding efficiency caused by the flickers and achieve the highly efficient coding.

Although the moving picture coding device according to the present invention has been described using the above embodiments, the present invention is not limited to this.

In other words, it should be considered that the embodiments disclosed herein are exemplary in all respects and not restrictive at all. It is intended that the scope of the present invention is indicated by not the above description of the embodiments but claims, and that any change that has equivalent meaning as the claims and fall within the claims are included.

For instance, in the present embodiment, the capturing unit 102 captures the object in the predetermined capturing cycle, and the picture information acquisition unit 122 acquires the picture information indicating the bright picture among the pictures obtained by capturing in the capturing cycle. However, if the picture information acquisition unit 122 can acquire the picture information indicating the bright picture, the capturing unit 102 does not need to capture the object in the predetermined capturing cycle.

Moreover, in the present embodiment, the picture information acquisition unit 122 acquires the picture information indicating the bright picture obtained by capturing in the light state, and the moving picture coding unit 106 codes the bright picture, using the intra-prediction coding method or the forward inter-prediction coding method. However, the picture to be coded by using the intra-prediction coding method or the forward inter-prediction coding method is not limited to the bright picture. In other words, the picture information acquisition unit 122 may acquire picture information indicating not the bright picture but a picture obtained by capturing in an environment having the same luminance as the environment where the bright picture is obtained by capturing, and the moving picture coding unit 106 may code the picture, using the intra-prediction coding method or the forward inter-prediction coding method.

It is to be noted that the moving picture coding device according to the embodiments of the present invention may include a CPU (Central Processing Unit), a system LSI (Large Scale Integration), a RAM (Random Access Memory), a ROM (Read Only Memory), an HDD (Hard Disk Drive), a network interface, and so on. In addition, the moving picture coding device may include a drive device which is capable of reading from and writing to a portable recording medium such as a DVD-RAM, a Blu-ray disc, an SD (Secure Digital) memory card.

It is to be noted that the moving picture coding device may be an embedded system such as a digital video camera, a digital recorder, a digital television, a game console, and a mobile phone.

Furthermore, a program for controlling the moving picture coding device (hereinafter, referred to as a moving picture coding program) may be installed in the HDD, ROM, or the like, and each of functions of the moving picture coding device may be realized by executing the moving picture coding program.

It is to be noted that the moving picture coding program may be recorded on a recording medium readable by a hardware system such as a computer system and an embedded system. Moreover, the moving picture coding program may be read out by an other hardware system via the recording medium and executed. With this, each function of the moving picture coding device can be realized in the other hardware system. Here, examples of the recording medium readable by the computer system include an optical recording medium (e.g., a CD-ROM), a magnetic recording medium (e.g., a hard disk), a magneto-optical recording medium (e.g., an MO), and a semiconductor memory (e.g., a memory card).

Furthermore, the moving picture coding program may be held by a hardware system connected to a network such as the Internet and a local area network. In addition, the moving picture coding program may be downloaded to an other hardware system via the network and executed. With this, each function of the moving picture coding device can be realized in the other hardware system. Here, examples of the network include a terrestrial broadcast network, a satellite broadcast network, PLC (Power Line Communication), a mobile phone network, a cable communication network (e.g., IEEE802.3), and a wireless communication network (e.g., IEEE802.11).

Alternatively, each function of the moving picture coding device may be realized by a moving picture coding integrated circuit implemented in the moving picture coding device.

Figure 11:
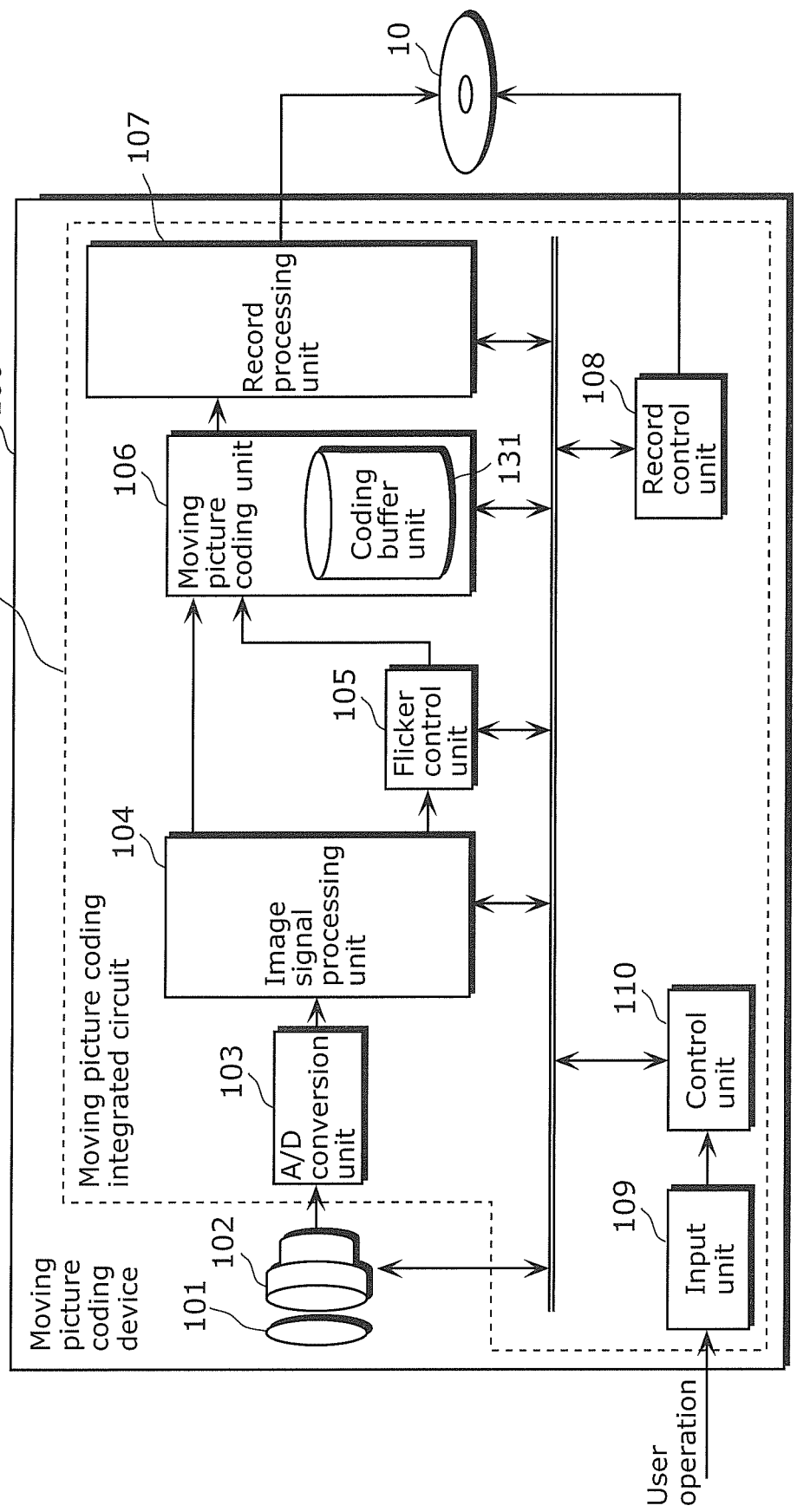
FIG. 11 is a diagram showing an example where a moving picture coding device is implemented as an integrated circuit.

FIG. 11 is a diagram showing an example where a moving picture coding device is implemented as an integrated circuit.

As shown in the diagram, functional blocks of the moving picture coding device are realized as a moving picture coding integrated circuit 400 which is an integrated circuit (LSI). More specifically, the functional blocks resulting from removing the lens group 101 and the capturing unit 102 from the block diagrams shown in FIGS. 1, 5, and 6 are realized as the moving picture coding integrated circuit 400. Moving picture coding integrated circuits 400 may be integrated into individual chips, or into a signal chip so as to include part or all of the moving picture coding integrated circuits 400.

Here, although an integrated circuit is referred to as an LSI, it may also be referred to as an IC, a system LSI, a super LSI, or an ultra LSI depending on a degree of integration. In addition, a circuit integration method is not limited to the LSI, and may be realized with a dedicated circuit or a general-purpose processor.

Additionally, if a new circuit integration technique is introduced in place of the LSI along with development in semiconductor technology or other derivative technology, it is obvious that the technique may be used for integrating functional blocks. There is a possibility of applying biotechnology and the like.

It is to be noted that the moving picture coding integrated circuit may be formed in a full-custom LSI (Large Scale Integration), a semi-custom LSI such as an ASIC (Application Specific Integrated Circuit), a programmable logic device such as a FPGA (Field Programmable Gate Array) and a CPLD (Complex Programmable Logic Device), or a dynamic reconfigurable device which is capable of dynamically rewriting a circuit configuration.

Moreover, design data for forming each function of the moving picture coding device in the moving picture coding integrated circuit may be a program described in a hardware description language (hereinafter, referred to as an HDL program). Furthermore, the design data may be a netlist at a gate level which is obtained by performing logic synthesis on the HDL program. Moreover, the design data may be macro-cell information in which configuration information, process conditions, and the like are added to the netlist at the gate level. Furthermore, the design data may be mask data in which size, timing, and the like are prescribed. Here, examples of the hardware description language include VHDL (Very high speed integrated circuit Hardware Description Language), Verilog-HDL, and System C.

Moreover, the design data may be recorded on the recording medium readable by the hardware system such as the computer system and the embedded system. Furthermore, the design data may be read out by the other hardware system via the recording medium and executed. The design data read by the other hardware system via the recording medium may be downloaded to the programmable logic device via a download cable.

Alternatively, the design data may be held by the hardware system connected to the network such as the Internet and the local area network. In addition, the design data may be downloaded to the other hardware system via the network and executed. The design data acquired by the other hardware system via the network may be downloaded to the programmable logic device via the download cable.

Alternatively, the design data may be recorded on a serial ROM so that the design data is transferred to the FPGA when the power is on. The design data recorded on the serial ROM may be directly downloaded to the FPGA when the power is on.

Alternatively, when the power is on, the design data may be generated by a micro processing unit and downloaded to the FPGA.

INDUSTRIAL APPLICABILITY

The present invention provides a moving picture coding device which makes it possible to suppress deterioration in coding efficiency caused by flickers occurring at a time of capturing under fluorescent lamp lighting or the like. In particular, the present invention is useful for a moving picture coding device which suppresses deterioration in coding efficiency caused by flickers occurring at a time of high-speed capturing.

REFERENCE SIGNS LIST

1 Capturing unit
2 Image signal processing unit
10 Recording medium
20 Moving picture coding unit
21 Motion compensated inter-prediction unit
100, 200, 300 Moving picture coding device
101 Lens group
102 Capturing unit
103 A/D conversion unit
104 Image signal processing unit
105 Flicker control unit
106 Moving picture coding unit
107 Record processing unit
108 Record control unit
109 Input unit
110, 210 Control unit
111 Lighting luminance photometry unit
121 Luminance information acquisition unit
122 Picture information acquisition unit
123 Flicker cycle acquisition unit
124 Control buffer unit 131 Coding buffer unit
141 Capturing cycle changing unit
400 Moving picture coding integrated circuit
510 Flicker removing unit
511 Stationary region level detecting unit
512 Level averaging unit
513 Level correcting unit

The invention claimed is:

1. A moving picture coding device which codes a plurality of pictures obtained by capturing an object, said moving picture coding device comprising: an acquisition unit configured to acquire the pictures; a luminance information acquisition unit configured to acquire luminance information which indicates a luminance level of light in an environment where the object is captured; a picture information acquisition unit configured to acquire picture information from the acquired pictures based on the luminance information, the picture information indicating a bright picture obtained by capturing in a light state in a flicker state of the light in the environment where the object is captured; and a coding unit configured to selectively perform, when prediction coding is performed on the bright picture indicated in the acquired picture information, one of (i) an intra-prediction coding method and (ii) an inter-prediction coding method for generating a predictive picture by referring to a bright picture that is (a) obtained by capturing at a capturing time before a capturing time of the bright picture indicated in the acquired picture information and (b) already coded.

2. The moving picture coding device according to claim 1 wherein said coding unit is configured to (i) divide the acquired pictures into groups, each of the groups including pictures among the acquired pictures, (ii) code the pictures included in the groups, and (iii) when coding the pictures, perform the intra-prediction coding method on a first bright picture in a capturing order among the pictures included in each of the groups.

3. A moving picture coding method for coding a plurality of pictures obtained by capturing an object, said moving picture coding method comprising: acquiring the pictures; acquiring luminance information which indicates a luminance level of light in an environment where the object is captured; acquiring picture information from the acquired pictures based on the luminance information, the picture information indicating a bright picture obtained by capturing in a light state in a flicker state of the light in the environment where the object is captured; and selectively performing, when prediction coding is performed on the bright picture indicated in the acquired picture information, one of (i) an intra-prediction coding method and (ii) an inter-prediction coding method for generating a predictive picture by referring to a bright picture that is (a) obtained by capturing at a capturing time before a capturing time of the bright picture indicated in the acquired picture information and (b) already coded.

* * * * *